(12) United States Patent
Yung et al.

(10) Patent No.: US 8,223,733 B2
(45) Date of Patent: *Jul. 17, 2012

(54) MULTI-PLATFORM WIRELESS COMMUNICATION SYSTEM FOR A VARIETY OF DIFFERENT USER TYPES

(75) Inventors: Kar W. Yung, Torrance, CA (US); Frank A. Hagen, Palos Verdes Estates, CA (US); Donald C. D. Chang, Thousand Oaks, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1439 days.

This patent is subject to a terminal disclaimer.

(21) Appl. No.: 11/049,499

(22) Filed: Feb. 2, 2005

(65) Prior Publication Data

US 2005/0153655 A1 Jul. 14, 2005

Related U.S. Application Data

(63) Continuation of application No. 09/576,648, filed on May 22, 2000, now Pat. No. 6,909,875, which is a continuation-in-part of application No. 09/271,997, filed on Mar. 18, 1999, now Pat. No. 6,337,980.

(51) Int. Cl.
*H04B 7/216* (2006.01)

(52) U.S. Cl. ........ 370/342; 370/316; 370/320; 370/335; 455/429; 455/452.1

(58) Field of Classification Search .......... 455/427–431, 455/424, 88, 7, 22, 15, 550.1, 552.1, 11.1–13.1; 370/342, 310, 315–316, 320; 342/352–354

See application file for complete search history.

(56) References Cited

U.S. PATENT DOCUMENTS

| | | | |
|---|---|---|---|
| 2,470,787 | A | 5/1949 | Nosker |
| 3,384,891 | A | 5/1968 | Anderson |
| 3,544,995 | A | 12/1970 | Bottenberg et al. |
| 4,161,730 | A | 7/1979 | Anderson |
| 4,161,734 | A | 7/1979 | Anderson |
| 4,255,814 | A | 3/1981 | Osborn |
| 4,359,733 | A | 11/1982 | O'Neill |
| 4,613,864 | A | 9/1986 | Hofgen |
| 4,718,109 | A | 1/1988 | Breeden et al. |
| 4,819,227 | A | 4/1989 | Rosen |
| 4,897,661 | A | 1/1990 | Hiraiwa |

(Continued)

FOREIGN PATENT DOCUMENTS

EP 0 182 027 A2 5/1986

(Continued)

OTHER PUBLICATIONS

U.S. Appl. No. 09/576,652, filed May 22, 2000, Hagen, et al.

(Continued)

*Primary Examiner* — Marcos Torres

(57) ABSTRACT

A mobile wireless communications system including a plurality of individual transponding nodes of various types, all in communication with a central processing hub. A local user signal is processed by the central processing hub and radiated through multiple paths to a plurality of the plurality of individual transponding platforms simultaneously. The signal is then re-radiated by each of the plurality of the plurality of individual transponding platforms to a mobile terminal that receives the re-radiated signal from the plurality of the plurality of individual transponding platforms coherently and in phase. The number of transponders and codes used to transmit each user signal can be readily adapted to user requirements.

8 Claims, 6 Drawing Sheets

U.S. PATENT DOCUMENTS

| | | | |
|---|---|---|---|
| 4,994,809 A | | 2/1991 | Yung et al. |
| 5,006,855 A | | 4/1991 | Braff |
| 5,099,245 A | | 3/1992 | Sagey |
| 5,111,209 A | | 5/1992 | Toriyama |
| 5,126,748 A | | 6/1992 | Ames et al. |
| 5,155,859 A | | 10/1992 | Harris et al. |
| 5,212,804 A | | 5/1993 | Choate |
| 5,233,626 A | | 8/1993 | Ames |
| 5,278,863 A | | 1/1994 | Briskman |
| 5,319,673 A | | 6/1994 | Briskman |
| 5,361,398 A | | 11/1994 | Christian et al. |
| 5,371,780 A | * | 12/1994 | Amitay .................. 455/450 |
| 5,379,320 A | | 1/1995 | Fernandes et al. |
| 5,387,916 A | | 2/1995 | Cohn |
| 5,410,314 A | | 4/1995 | Frush et al. |
| 5,423,059 A | | 6/1995 | LoGalbo et al. |
| 5,444,450 A | | 8/1995 | Olds et al. |
| 5,485,485 A | | 1/1996 | Briskman et al. |
| 5,525,995 A | | 6/1996 | Benner |
| 5,584,047 A | | 12/1996 | Tuck |
| 5,592,471 A | | 1/1997 | Briskman |
| 5,625,640 A | | 4/1997 | Palmer et al. |
| 5,644,572 A | | 7/1997 | Olds et al. |
| 5,736,959 A | | 4/1998 | Patterson et al. |
| 5,739,785 A | | 4/1998 | Allison et al. |
| 5,805,983 A | | 9/1998 | Naidu et al. |
| 5,864,579 A | | 1/1999 | Briskman |
| 5,867,109 A | * | 2/1999 | Wiedeman .................. 455/13.1 |
| 5,875,402 A | | 2/1999 | Yamawaki |
| 5,898,902 A | | 4/1999 | Tuzov |
| 5,899,957 A | | 5/1999 | Loomis |
| 5,903,549 A | | 5/1999 | Von der Embse et al. |
| 5,920,284 A | | 7/1999 | Victor |
| 5,944,770 A | | 8/1999 | Enge et al. |
| 5,945,948 A | | 8/1999 | Buford et al. |
| 5,949,766 A | | 9/1999 | Ibanez-Meier et al. |
| 5,969,674 A | | 10/1999 | Von der Embse et al. |
| 5,974,317 A | | 10/1999 | Djuknic et al. |
| 6,016,421 A | | 1/2000 | Weiss et al. |
| 6,067,458 A | | 5/2000 | Chen |
| 6,094,581 A | | 7/2000 | Fried et al. |
| 6,138,012 A | | 10/2000 | Krutz et al. |
| 6,151,308 A | | 11/2000 | Ibanez-Meier et al. |
| 6,233,456 B1 | | 5/2001 | Schiff et al. |
| 6,246,363 B1 | | 6/2001 | Yung et al. |
| 6,275,479 B1 | | 8/2001 | Snell et al. |
| 6,278,876 B1 | * | 8/2001 | Joshi et al. .................. 455/427 |
| 6,298,238 B1 | * | 10/2001 | Dai .................. 455/456.2 |
| 6,308,085 B1 | | 10/2001 | Shoki |
| 6,337,980 B1 | | 1/2002 | Chang et al. |
| 6,377,208 B2 | | 4/2002 | Chang et al. |
| 6,507,739 B1 | * | 1/2003 | Gross et al. .................. 455/431 |
| 6,507,926 B1 | | 1/2003 | Wright |
| 6,529,485 B1 | | 3/2003 | Agarwal et al. |
| 6,542,754 B1 | | 4/2003 | Sayers et al. |
| 6,587,687 B1 | | 7/2003 | Wiedeman |
| 6,621,801 B1 | | 9/2003 | Wright et al. |
| 6,633,590 B1 | | 10/2003 | Garofalo et al. |
| 6,665,316 B1 | | 12/2003 | Eidson |
| 6,674,730 B1 | | 1/2004 | Moerder |
| 6,707,800 B1 | | 3/2004 | Peyrovian et al. |
| 6,731,614 B1 | * | 5/2004 | Ohlson et al. .................. 370/320 |
| 6,731,949 B2 | | 5/2004 | Hamabe et al. |
| 6,757,546 B1 | | 6/2004 | Hagen et al. |
| 6,768,906 B2 | | 7/2004 | Matthews et al. |
| 6,885,647 B1 | * | 4/2005 | Chung et al. .................. 370/335 |
| 2003/0083103 A1 | | 5/2003 | Drawert |
| 2003/0231613 A1 | | 12/2003 | Bertrand et al. |
| 2004/0032883 A1 | | 2/2004 | Knapp et al. |

FOREIGN PATENT DOCUMENTS

| | | |
|---|---|---|
| EP | 0 335 558 A2 | 4/1989 |
| EP | 0 682 416 A2 | 11/1995 |
| EP | 0 749 252 A2 | 12/1996 |
| GB | 2 271 902 A | 10/1993 |
| GB | 2 306 827 A | 5/1997 |
| JP | 2028580 | 1/1990 |
| JP | 3291584 | 12/1991 |
| JP | 4027887 | 1/1992 |
| JP | 7146995 | 6/1995 |
| JP | 8015405 | 1/1996 |
| JP | 9026328 | 1/1997 |
| JP | 9113600 | 5/1997 |
| JP | 10090391 | 4/1998 |
| WO | WO 90/13186 | 11/1990 |

OTHER PUBLICATIONS

U.S. Appl. No. 09/584,012, filed May 30, 2000, Chang, et al.
U.S. Appl. No. 09/587,960, filed Jun. 6, 2000, Yung, et al.
U.S. Appl. No. 09/587,759, filed Jun. 6, 2000, Yung, et al.
U.S. Appl. No. 09/550,505, filed Apr. 17, 2000, Chang, et al.
U.S. Appl. No. 09/669,095, filed Sep. 25, 2000, Yung, et al.
U.S. Appl. No. 09/655,498, filed Sep. 5, 2000, Chang, et al.
Teles, J. et al.: "Overview of TDRSS" Orbit Determination and analysis. PSD Meeting, Cospar Technical Panel on Satellite Dynamics, $13^{th}$ Cospar Scientific Assembly, Hamburg, Germany, Jul. 11-21, 1994, Advances in Space Research, pp. 67-76.
Bricker, P. et al.: "Integrated Receiver for NASA Tacking and Data Relay Satellite System", *MILCOM 90. A New Era, 1990 IEEE Military Communications Conference*, Monterey, CA USA, Sep. 30-Oct. 3, 1990, pp. 1-5.
Dunham, J.B. et al.: Onboard Orbit Estimation with Tracking and Data Relay Satellite System Data:, Journal of Guidance, Control, and Dynamics, Jul.-Aug. 1983, USA, vol. 6, No. 4, pp. 292-301.
Bethke, K.H. "A Novel Noncooperative Near-Range Radar network or Traffic Guidance and Control on Airport Surfaces", *IEEE Transactions on Control Systems Technology*, vol. 1, No. 3, Sep. 1993.
Doc 9524 FANS/4-WP/76, International Civil Aviation Organization, Special Committee on Future Air Navigation Systems, Fourth Meeting, Montreal, May 2-20, 1988, Report, pp. 3.2B-2 & 3.2B-3.
Chan, K.K., Marcoux, F., Forest, M., Martins-Camelo, L.: "A Circularly Polarized Waveguide Array for Leo Satellite Communications", pp. 154-157, IEEE 1999 AP-S International Symposium, Jun. 1999.
Oodo, M., Miura, R., Hase, Y.: "Onboard DBF Antenna for Stratospheric Platform", pp. 125-128, IEEE Conference on Phased Array Systems and Technology, California, May 21-25, 2000.
Yokosuka Research Park, "The First Stratospheric Platform Systems Workshop", pp. 1-216, May 12-13, 1999.

* cited by examiner

MULTI-PLATFORM WIRELESS COMMUNICATION SYSTEM FOR A VARIETY OF DIFFERENT USER TYPES

CROSS-REFERENCE TO RELATED APPLICATIONS

The present application is a continuation of assignee's prior co-pending application Ser. No. 09/576,648, filed May 22, 2000 now U.S. Pat. No. 6,909,875, which is a continuation-in-part of assignee's Ser No. 09/271,997, filed Mar. 18, 1999, U.S. Pat. No. 6,337,980, entitled "Multiple Satellite Mobile Communications Method and apparatus for Hand-Held Terminals", issued Jan. 8, 2002.

TECHNICAL FIELD

The present invention relates generally to a wireless communication system. More specifically, the present invention relates to a multi-transponder wireless communication system which achieves better utilization of the total system resources by allowing for flexible combinations of user types.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain hand-held terminals utilized by the users of these systems, transmit and receive signals to and from high performance satellites which populate almost the entire hemisphere. Some of these current systems require access to at least two satellites to assure a soft hand-over process as the satellites progress from horizon to horizon. As a result, the satellite system becomes more reliable and available as more satellites come into a user's field of view (FOV). The satellite constellations provided by these current systems are thus sized to guarantee a minimum number of satellites within a user's FOV over large coverage areas at all times.

All of these current mobile satellite communication systems, however, suffer from certain disadvantages. First, they all have limited frequency (the term "frequency" is generalized herein to refer to frequency, time slot or CDMA code) resources. Any given frequency over a given ground position can only be utilized by one user at a time. Thus, if one user accesses a satellite using a particular frequency slot to communicate to his counterpart on network, other satellites and/or users in the same region cannot reuse the same frequency resource in the same local area. In particular, if a nearby secondary user has a handset that requires the same frequency resources as is being utilized by the first user, the second user is unable to access the system, even via different satellites. This is true regardless of the sophistication of the system, including systems that utilize multiple beam satellite designs. Even when multiple satellites are available at a given geographic location, the same frequency spectrum cannot be used by more than one user in a local area. The availability of multiple satellites merely serves to increase the availability of the system to the user. However, the total capacity of these mobile communication satellite systems is still limited by their inefficient usage of the available frequency resources. Thus, the potential growth of these current satellite communication systems is inherently limited.

Additionally, current telecommunications systems generally allow only mobile-to-hub and hub-to-mobile communications in most low earth orbit and medium earth orbit mobile satellite constellations. Mobile-to-mobile linkages require multiple hops between hubs. This means that two or more frequency resources must be committed by the system to close the links.

It is clearly desirable to provide a mobile communication satellite system that relaxes the above constraints, and more efficiently utilizes current mobile satellite communication system resources, while also providing much greater opportunity for system growth.

SUMMARY OF THE INVENTION

It is an object of the present invention to provide a wireless communication system with reduced limitations on frequency re-use for point-to-point communications.

It is another object of the present invention to provide a wireless communication system that utilizes individual transponders and mobile terminals that are relatively simple and of low complexity.

It is a further object of the present invention to provide a wireless communication system with high system reliability through graceful degradation.

It is still another object of the present invention to provide a multi-transponder wireless communication system that allows flexible combination of user types.

It is a related object of the present invention to provide a multi-transponder wireless communication system with better utilization of total system resources.

In accordance with the above and other objects of the present invention, a multi-transponder wireless communication system is provided. The wireless communication system includes a plurality of individual communication transponding nodes. The plurality of individual transponding nodes are each in communication with a ground hub such that a signal processed by the ground hub in the forward link is radiated with compensating time delays to one or more of the plurality of individual transponders. The radiated signals are then re-radiated by the plurality of individual transponders and coherently received and processed by a mobile user terminal. The return link signal path is the reverse of the forward link.

In accordance with another object of the present invention, the system includes a first mobile terminal having an assigned code space. The first mobile terminal receives the re-radiated signal from one or more of the plurality of individual transponders. The system also includes a second mobile terminal having an assigned code space that is different than that of the first mobile terminal. The second mobile terminal also receives the re-radiated signal from one or more of the plurality of individual transponders. The system also includes a third mobile terminal that has an assigned code space that overlaps the assigned code spaces of either or both of the first and second mobile terminal in whole or in part. The third mobile terminal receives the re-radiated signal from one or more of the plurality of individual transponders, whereby the one or more transponders from which the third mobile terminal receives the signal are different than the one or more individual transponders that communicate with either the first or second mobile terminal having the same or overlapping code space as the third mobile terminal.

These and other features of the present invention will become apparent from the following description of the inven-

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite and wireless spectrum multiple times. By eliminating this frequency spectrum limitation on the operation of multiple satellites, the overall capacity of existing mobile satellite and wireless communication systems can more readily expand.

Figure 1:
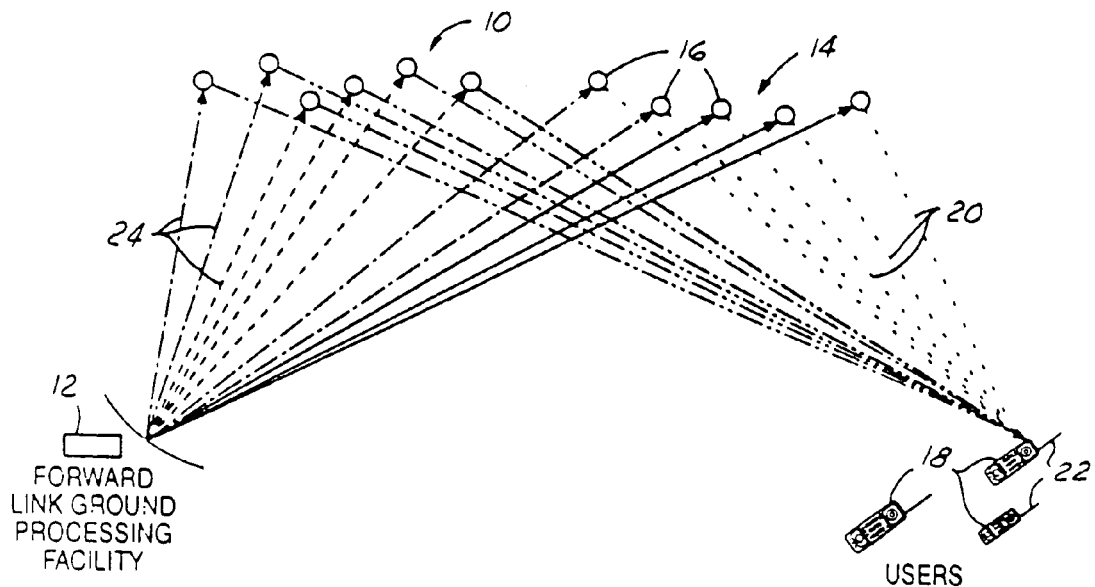
FIG. 1 is a schematic illustration of the forward link geometry of a mobile satellite communications system in accordance with the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 including a plurality of individual satellites 16, and a plurality of hand-held user terminals 18 such as mobile phones. As discussed in more detail below, the user terminals 18 can receive signals 20 simultaneously from multiple satellites 16 via their broad beam antennas 22. The ground telecommunications hub 12 is in communication with all of the satellites 16 in the satellite constellation 14 individually and simultaneously. The hub 12 also pre-processes user signals to compensate for path differentials before sending radiated signals 24 to the satellites 16, as discussed in more detail below.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen field of view ("FOV"). The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beamforming and filtering, as discussed below.

Figure 2:
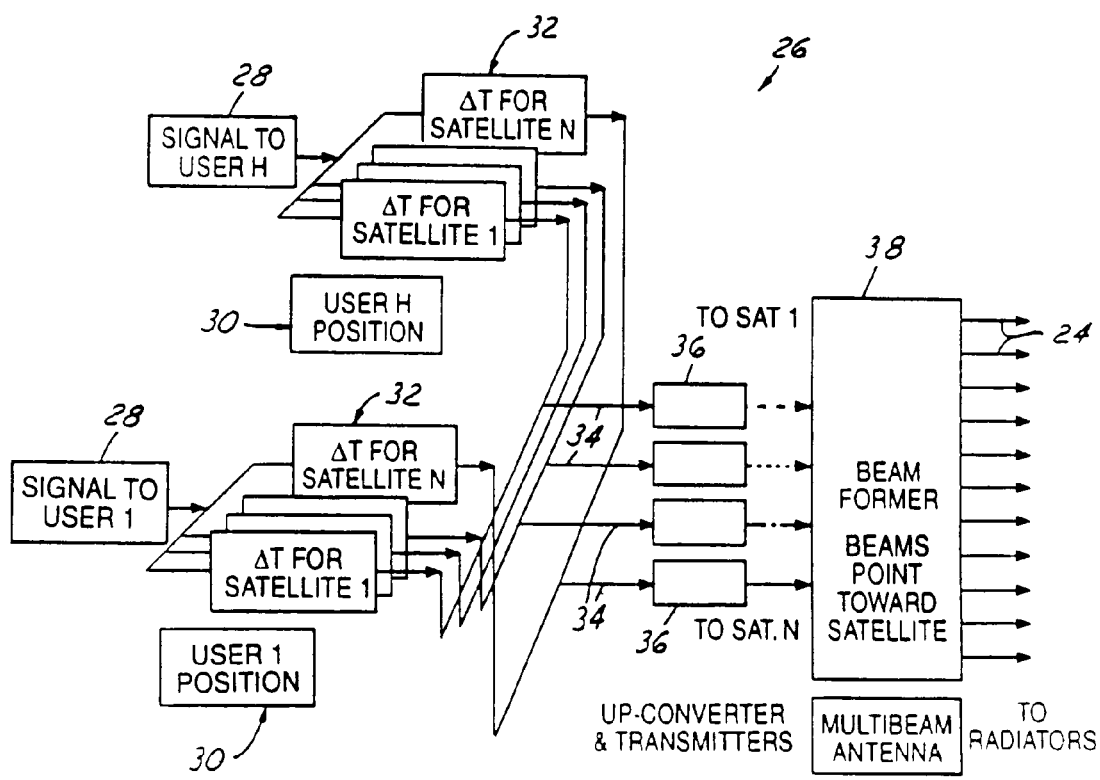
FIG. 2 is a schematic block diagram illustrating the signal transmission function of a ground telecommunications hub for a wireless communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information must be within a tenth of an RF wavelength. For UHF satellite systems, the required path differential accuracy is preferably about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to provide separate signals to different satellites. Alternatively, code identification can also be used to address different satellites independently.

As shown in FIG. 2, assuming that there are "H" users, the signals from user 1 to user H, identified generally by reference number 28, are input into the processing center 26. The position of the various users (1 to H), are determined generally by the circuitry from the various user signals 28, designated by reference number 30. The various user signals 28 for user 1 to user H are then combined for transmission to the different satellites 16, as generally indicated by reference number 32. In this case, the signal is sent to N satellites. The combined signals are then amplified, filtered, up converted, and then further amplified, as generally indicated by reference number 36. These signals are then delivered to a multiple beam antenna 38 where beam-forming processing is done so that the signals can be transmitted to the N satellites via radiating signals 24. The beam-forming process can be done in baseband or a low IF frequency band by either digital or analog means. For a low bandwidth (less than a few MHz signals), digital implementation can provide cost advantages. The processed signal 24, radiated from the ground hub 12 to each satellite, is amplified, filtered, and then re-radiated by each of the multiple satellites 16 to arrive at a designated user location simultaneously. Consequently, the radiated signals from the multiple satellites will be received coherently by a simple hand held terminal 22.

Equivalently, the effect of the spatial processing performed by the processing center 26 is to focus signal strength on the user from multiple satellites 16, which act like sparsely separated portions of a large active reflector. Therefore, the processing on the ground will insert different time delays into the signals 24 which are radiated via various paths. The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
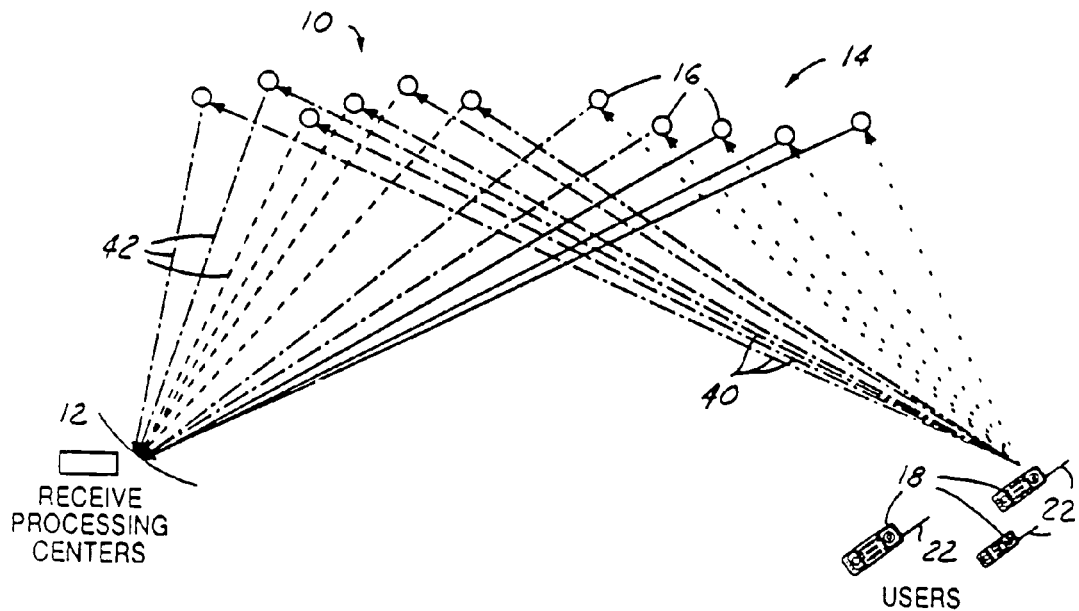
FIG. 3 is a schematic illustration of the return link geometry of a wireless communications system in accordance with a preferred embodiment of the present invention.

In a receive mode, shown in FIG. 3, the individual satellites 16 collect RF signals from the same FOV. FIG. 3 illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. For best performance, the user antennas 22 preferably are able to illuminate all the satellites 16 involved. This will lead to a constraint on the variation of the gain of the user antenna 22 over the cluster.

As with the forward link geometry, the satellites 16 will amplify the signals 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
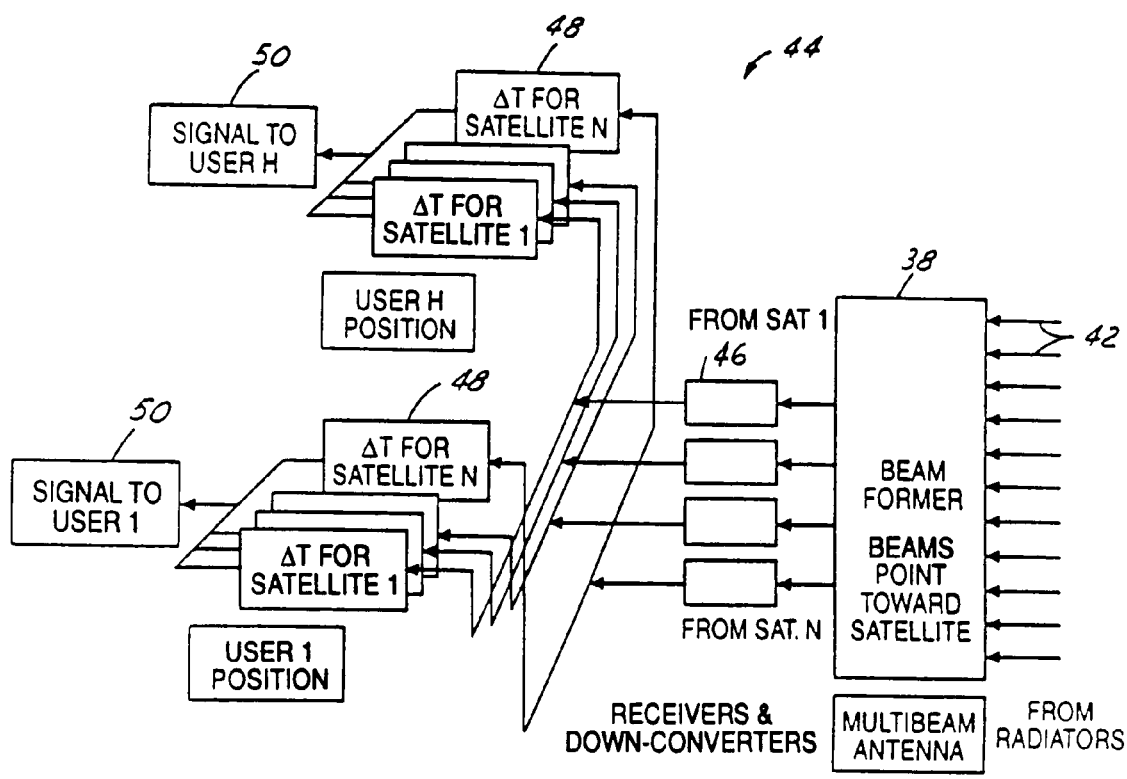
FIG. 4 is a schematic block diagram illustrating the signal receive function of a ground telecommunications hub for a wireless communications system in accordance with a preferred embodiment of the present invention.

The signal flows on the block diagram shown in FIG. 4 illustrate the receive function of the post-processor 40 and the hub 12. The signal flows are reversed from the corresponding ones in FIG. 2. Therefore the receive process will not be reiterated in detail. However, the links 42 from the satellites 16 to the hub 12 are received at the beamformer 38 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit function are a necessary part of the pathlink calibration and user positioning.

The technique of the present invention has been demonstrated to significantly reduce the average side lobe levels. It has been determined that this is due to three factors. First, the proposed architecture is not a periodic array, but rather a randomly spaced sparse array, which has no grating lobes. Although the average side lobe level at a single frequency is relatively high, the level decreases with increasing bandwidth. Second, the large sparsely filled array formed by moving satellites is a large extended aperture size. Thus, all of the users on the ground are in the near field of the extended aperture and the wave fronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth spectrum. The information signal will therefore be spread over this bandwidth via CDMA or through short duration waveforms for TDMA schemes.

Figure 5:
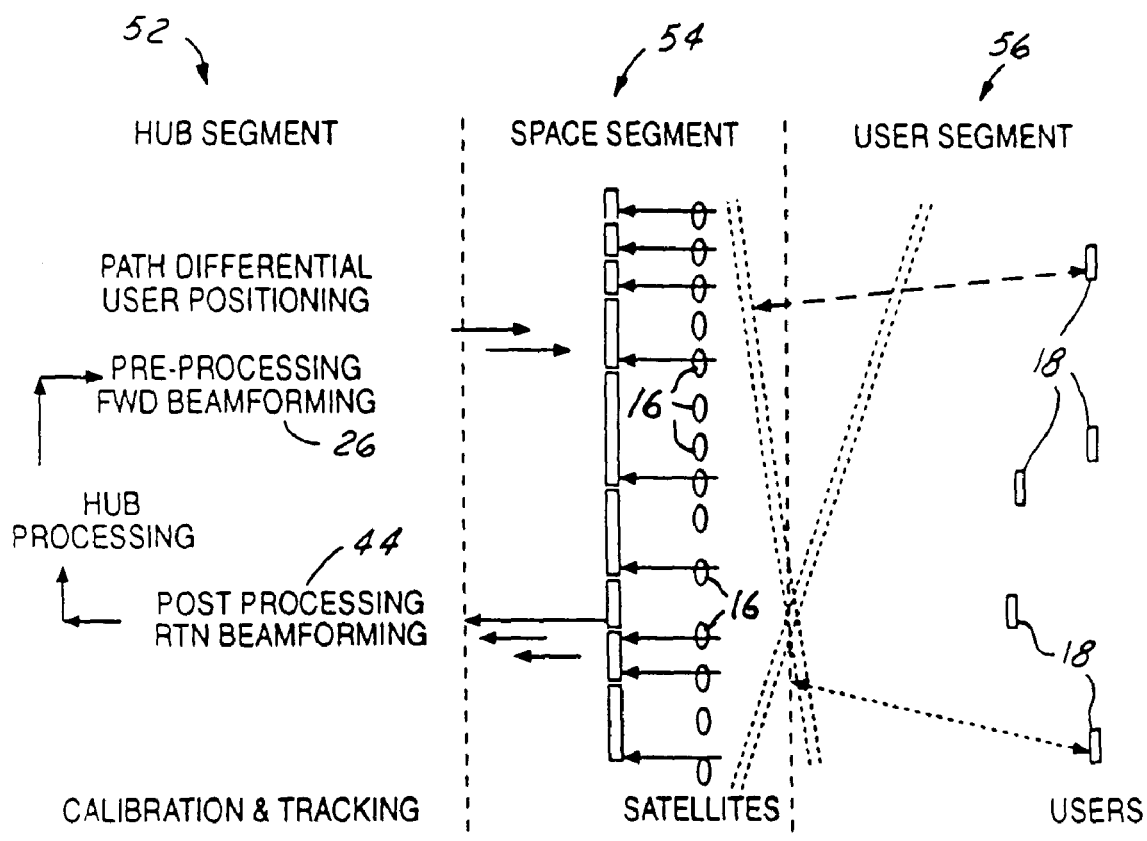
FIG. 5 is a schematic flow diagram illustrating the overall architecture for a wireless communications system in accordance with a preferred embodiment of the present invention.

FIG. 5 illustrates diagrammatically the operation of the invention, which allows for the increased re-use of precious frequency spectrum by multiple satellites. The advantages provided by this system include no limitation on frequency re-use by additional satellites for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs.

The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. Further, the system also benefits from large percentage bandwidths available with CDMA and TDMA systems.

As shown in FIG. 5, the present invention is divided up into three segments: a hub segment 52 containing the ground telecommunications hub 12, a space segment 54 containing a plurality of individual satellites 16, and a user segment 56, having a plurality of user terminals 18. The hub segment also has a processing center 26 and a post-processor 44 for processing the received and transmitted signals.

The user terminals 18 receive and transmit signals simultaneously from/to multiple satellites 16 via their broad beam antennas. The user terminals 18 do not require any capability to separately address the individual satellites 16 of the space segment 54. The hub 12 maintains links with each of the satellites 16 in the space segment 54 individually and simultaneously. The hub 12 pre-processes the signals intended for each remote user on transmission and post-processes the signals supplied to each local user on reception to compensate for path differentials. These corrections are separately computed and applied to the signals transmitted to or received from each satellite 16 of the space segment 54 for each user.

Figure 6:
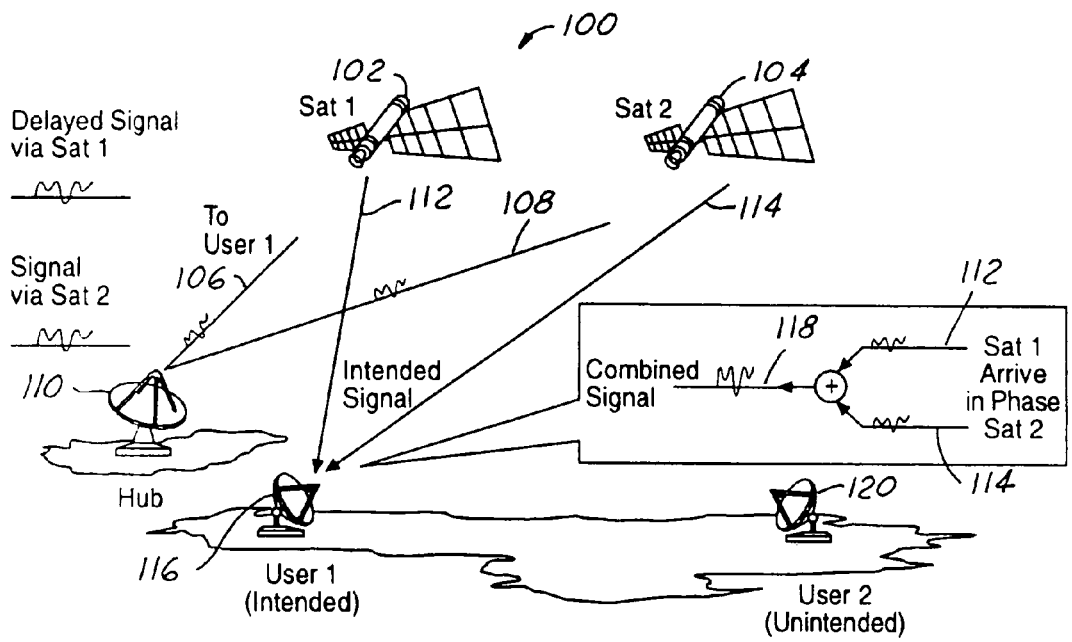
FIG. 6 is a schematic illustration of a multi-transponder wireless communication system illustrating signals being received coherently by their intended remote user.

FIG. 6 illustrates a multi-platform communication system 100 with improved frequency reuse efficiency in accordance with a preferred embodiment of the present invention. In particular, the system illustrated in FIG. 6 uses CDMA coding to subdivide the frequency resource among the various users. The system 100 enables a plurality of transponders 102, 104 to receive signals 106, 108 from the ground hub 110 and to transmit the signals 112, 114 at the same frequency with reduced interference to the intended user 116 from signals intended for other users. This is achieved by synchronizing the transmitted signals at the hub in such a way that the intended user 116 will receive all of the signals 112, 114 synchronously and completely in phase.

Based on the distances from the hub 110, to the various transponders 102, 104 and the distances between the transponders 102, 104 and the intended user 116, the appropriate compensating time delays are calculated and injected into each forward link message at the hub such that the intended user will coherently receive a combined signal from all the transponders as generally indicated at 118. The forward link to the intended user 116 follows the sequence of the hub 110 to the first transponder 102 to the user 116 (hub→trans 1→user 1) and also from the hub 110 to the second transponder 104 to the user 116 (hub→trans 2→user 1). Using the correct time delay on each forward link, all intended signals 112, 114 will arrive at the intended user 116 in phase. Conversely, the same signals intended for the intended user 116 will arrive out of phase at a non-intended user 120 and all other non-intended users in the area. This is shown in FIG. 7, which is described below.

Figure 7:
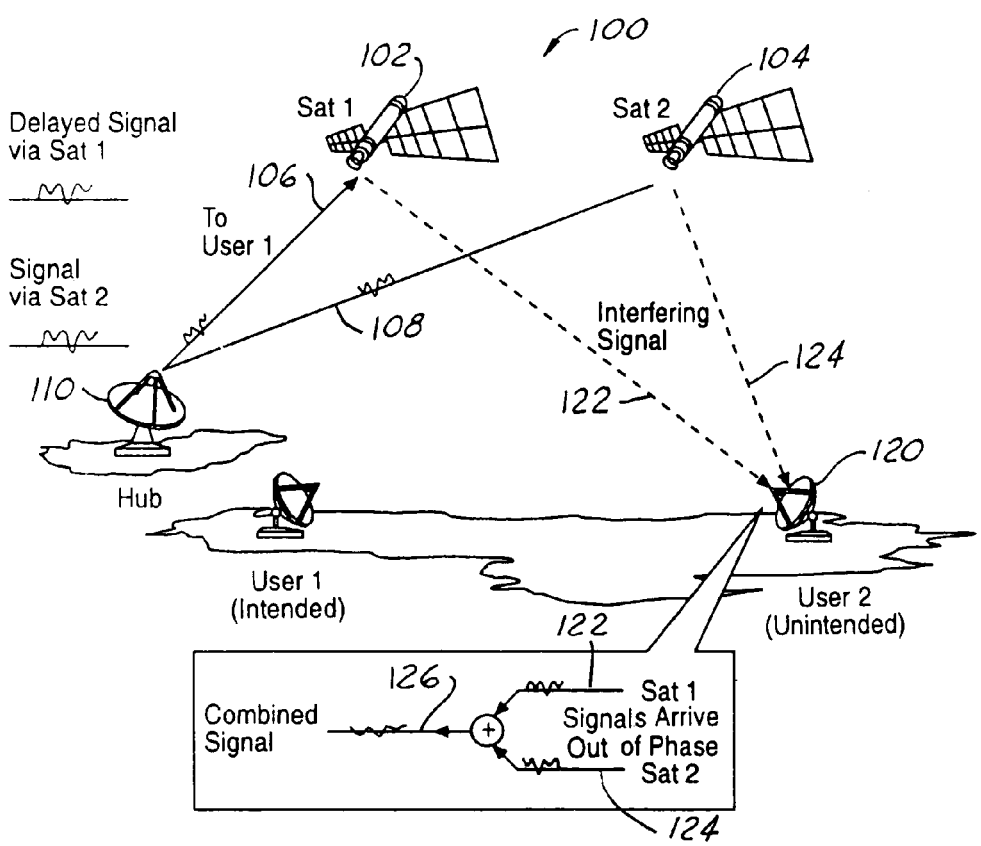
FIG. 7 is a schematic illustration of the multi-transponder wireless communication system of FIG. 6 illustrating the same signals being received incoherently by a remote non-intended user.

FIG. 7, illustrates the operation of the system of FIG. 6 with respect to the non-intended user 120. The distance between the hub 116 and the first transponder 102 and the distance between the first transponder 102 and the non-intended user 120 (hub→trans 1→user 2) and the distance between the hub 116 and the second transponder 104 and the distance between the second transponder 104 and the non-intended user 120 (hub→trans 2→user 2) are different in this case. Because of the distance differences, the signals 122, 124 will arrive at the non-intended user 120 at a different times and out-of-phase. The combined signal 126 will thus appear as noise and can be rejected as such by the terminal of the non-intended user 120.

It should be understood that the transponders 102, 104 can be part of any type of wireless communication system or can even be selected from several such systems. For example, while a space based system using satellites is illustrated, regional and national tower-based cellular networks for fixed and mobile communications may also be utilized. Additionally, any high altitude platform system, such as manned/ unmanned airships, balloons, or airplanes may also be utilized. Further, while only two transponders are illustrated, an unlimited number of transponders may be utilized. Moreover, while the multiple transponders are shown as being part of a unitary system, any combination of transponders can be used to transmit signals in accordance with the present invention. For example, a signal may be transmitted to a user through both a space-based system and a high altitude platform system. Finally, different sets of transponders may be used to communicate with different users. These various sets may overlap in whole, in part or not at all.

Figure 8:
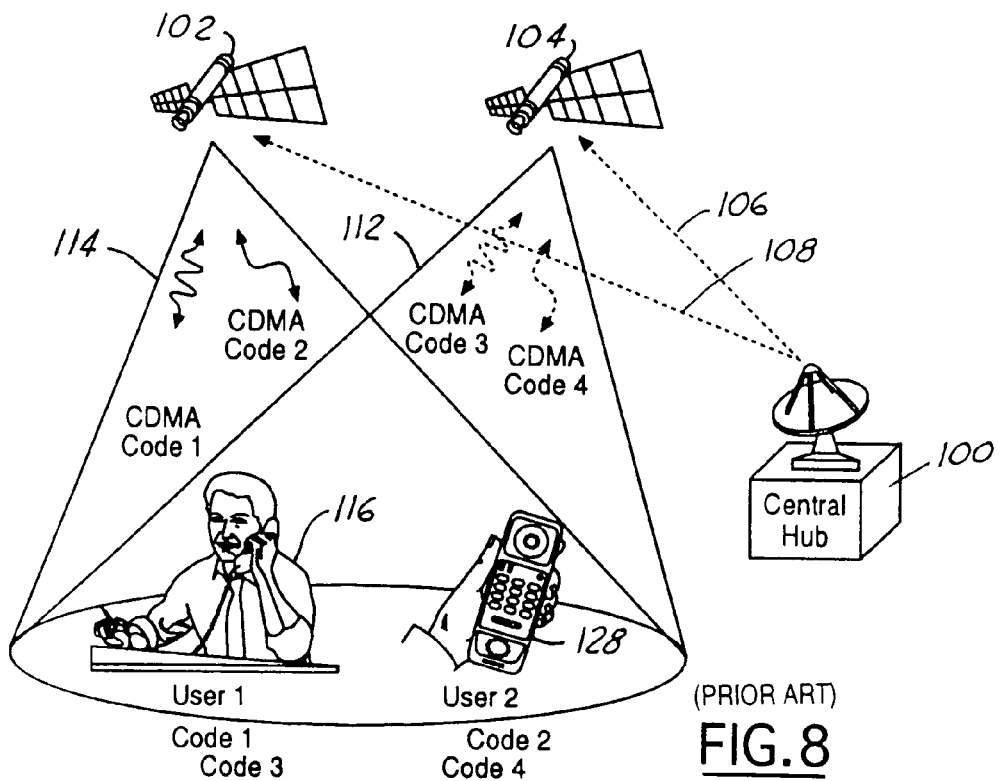
FIG. 8 is a schematic illustration of a conventional approach to an asynchronous CDMA system that may be utilized in accordance with the present invention.

As is known, in conventional CDMA single transponder systems, unique CDMA codes are assigned to each user to avoid interference. Similarly, in multi-transponder systems, when two or more transponders are serving the same geographical location, unique CDMA codes must be used to distinguish the various signals and to avoid interference. For example, as shown in FIG. 8, which illustrates a conventional CDMA multi-transponder system, user 116 must use different codes for signals 112, 114 received from the two different transponders 102, 104. Thus, two distinct codes, "code 1" and "code 3" are assigned to the same user 116 in this example, with "code 1" being assigned to signal 112 and "code 3" being assigned to signal 114. If both transponders 102, 104 were to transmit at "code 1", the two received signals 112, 114 would interfere with each other and the terminal of the user 116 would not be able to decode the signals correctly. Two additional codes must be assigned to each additional user, such as user 128 who is assigned codes 2 and 4.

The various CDMA codes for co-located users can be synchronous or asynchronous. A synchronous orthogonal code gives an advantage of about 15 dB or better over asynchronous CDMA codes. For multiple platforms, it is hard to synchronize CDMA codes among users. Thus, for the disclosed multi-platform system, asynchronous CDMA communication is assumed. Although multiple transponder nodes increase the system availability and total power resource, it under-utilizes the system's full potential, because there are only a finite number of codes available due to the finite bandwidth available to a system. Thus, the total bandwidth limits the number of users the system can serve and the system is unable to fully utilize the power and capacity it was designed to handle.

Figure 9:
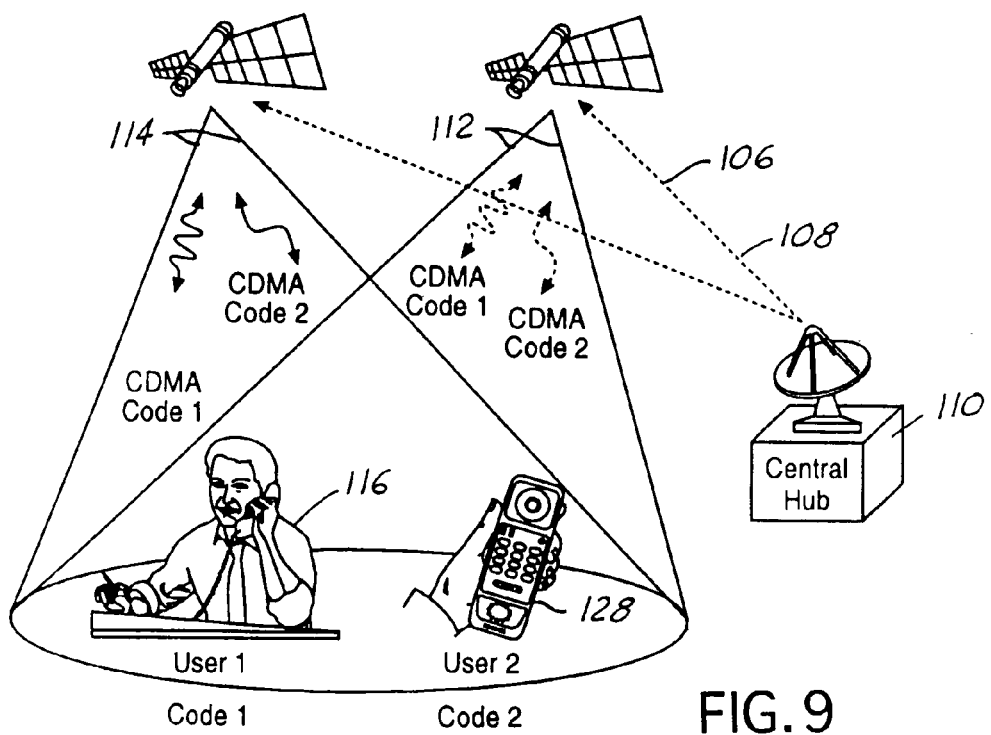
FIG. 9 illustrates a preferred embodiment of the present invention applied to the asynchronous CDMA system of FIG. 8.

In the preferred embodiment, the system 100 is an asynchronous CDMA system that utilizes imbedded time delays as described in co-pending patent application Ser. No. 09/550,505, filed Apr. 17, 2000,and entitled "Coherent Synchronization of Code Division Multiple Access Signals," which is hereby incorporated by reference. In accordance with the preferred system, the signals 112, 114 from each transponder 102, 104 will arrive completely in-phase because appropriate time delays are pre-determined and applied to the signals 112, 114 at the central hub 100, as is shown in FIG. 9. It should be understood that other time delay methods can also be utilized.

As shown, the first user 116 receives signals 112 from each of the transponders 102, 104 using the same code ("code 1"). Similarly, the second user 128 receives signals 114 from each of the transponders 102, 104 using the same code ("code 2"). The central hub 110 determines the time delay between the users and the hub for signals transmitted or received via each transponder and inserts appropriate delays to equalize the total delay via each transponder. Thus, the intended signals from different transponders will all arrive at the intended user in-phase, while non-intended signals will arrive out of phase.

Figure 10:
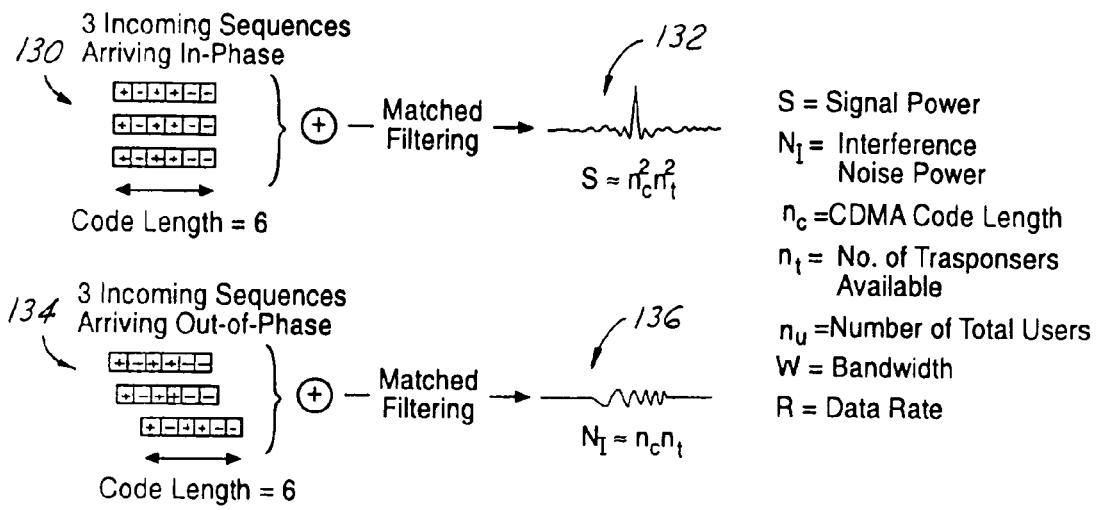
FIG. 10 is a schematic diagram illustrating the reception of matched filtered signals arriving from multiple transponder nodes in accordance with the preferred CDMA system of FIG. 9.

FIG. 10 illustrates the summation or matched-filtering of signals at a user's terminal in accordance with the present invention. The CDMA matched-filtering of the total signal received from all the transponders at the terminal produces greater signal strength when there are multiple satellites. As discussed above, CDMA signals that are not intended for the user will appear as noise and can be suppressed. Thus, the same CDMA code can be reused under certain restrictions.

Referring to FIG. 10, reference number 130 generally indicates three incoming sequences of information that are arriving in-phase. Each of the signals in this example has a code length of six and the signals are match-filtered to form a signal which is generally represented by 132 and the signal strength out of the unmatched filter is determined according to the equation $$S \approx n_c^2 n_t^2$$

The reference number 134 generally indicates three incoming sequences that are arriving out-of-phase. In this example, each of the signals has a code length of six; the signals are match-filtered and appear as noise as generally represented by 136. The interference or nose power is expressed according to the equation $$N_f \approx n_c n_t$$

It has been determined that the signal-to-noise ratio for a typical user is governed by the following equation:

$$\left(\frac{S}{N_I}\right)_{CT} \approx \frac{n_c n_t}{n_u - 1} \qquad \text{Equation 1}$$

where
S=Signal Power;
$N_I$=Interference Noise Power;
$n_c$=CDMA Code Length;
$n_t$=No. of Transponders; and
$n_u$=No. of Total Users.

It has further been determined that as long as the users are sufficiently far separated, the same CDMA code can be re-used without significantly degrading the signal-to-noise ratio. The system capacity of the disclosed system is thus proportional to $n_c$ and $n_t$.

Figure 11:
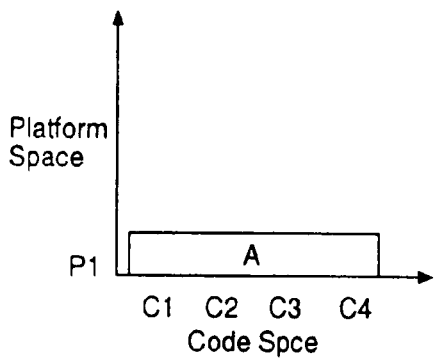
FIG. 11 is a schematic diagram illustrating an exemplary distribution of users in code space for a single platform system.

In order to describe the operation of the disclosed concept, an exemplary multi-platform system is disclosed. The exemplary multi-platform system consists of four platforms (P1, P2, P3, P4) and four code choices (C1, C2, C3, C4). In FIG. 11, assuming a given power capacity for each platform and the total code space needed to support one user A if there is only one platform P1, the distribution of users in code space is illustrated.

Figure 12:
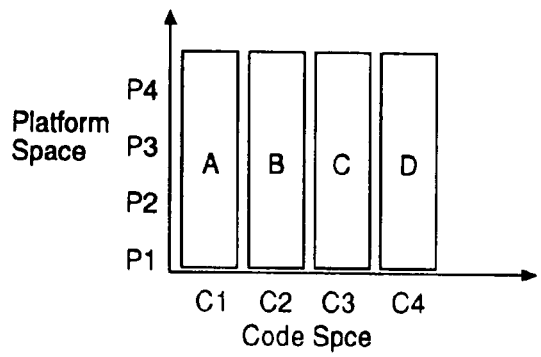
FIG. 12 is a schematic diagram illustrating an exemplary distribution of users in platform-code space for a multiple platform system.

Refer now to FIG. 12, which is another exemplary multi-platform system consisting of four platforms (P1, P2, P3, P4) and four code choices (C1, C2, C3, C4). This system illustrates four similar users (A, B, C, D) who may be located at the same location. The CDMA concept described above allows the signals from the various platforms to be combined coherently for each user, and also allows the users to be distributed in a two-dimensional space. The net effect of this example is that the total communication capacity is $n_t$ times larger. As shown, the platform space behaves like code space as indicated by Equation (1) above. Further, the total system capacity can be utilized when all platforms are used for all users.

Figure 13:
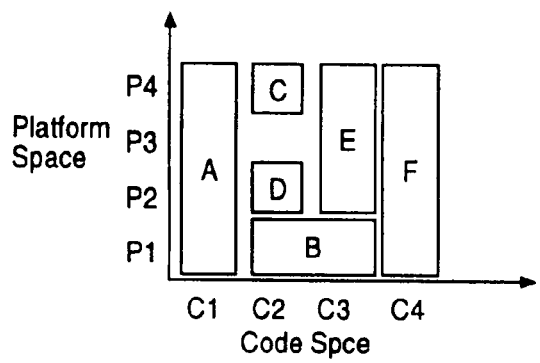
FIG. 13 is a schematic diagram illustrating an alternative exemplary distribution of users in platform-code space for multiple platform system.

In accordance with a preferred embodiment of the present invention, the platform space is treated as a new resource dimension. As shown in FIG. 13, the preferred system allows individual users to use less than the total number of platforms or transponders in a given system. Thus, for the exemplary system shown, the platform space includes four platforms (P1, P2, P3, P4) and the code space includes four distinct codes (C1, C2, C3, C4). It should be understood that any number of platforms and codes can be utilized. With prior disclosed configurations, a user assigned a particular code would utilize all platforms to close the forward and return links. This resulted in the full system capacity being utilized.

As shown in FIG. 13, which is merely an exemplary figure for illustration purposes only, the disclosed system is not limited by either the size of the platform space or the size of the code space alone. The system can support users (A, B, C, D, E, F) all being of different types, i.e., having different bandwidth capabilities or other characteristics. Thus, users A and F utilize all of the platforms across a given code space. User B only utilizes one code across two platforms. This configuration allows users C, D and E to each utilize the same or overlapping code space as user B with different platforms.

The platform-code space diagram shown in FIG. 13 includes a plurality of individual cells. With each individual cell being associated with a particular code space and a particular platform space. The number of cells, shown in FIG. 13 is equal to the number of platforms multiplied by the number of codes. Thus, in FIG. 13, sixteen individual cells exist, with the first cell being located in the diagram at the coordinate position identified by ($P_1,C_1$) and the last cell being located in the diagram at the coordinate position identified by ($P_4, C_4$). The identification of the other cells will be known and understood by those of skill in the art. In this configuration, no individual cell can be utilized by more than one user at any given time.

It can be seen that the operation of the disclosed system allows a variety of user types to utilize the system at any given time (different data rates and antenna gains). Each utilizes a flexible number of platforms and codes. It is possible that the system capacity may not be fully utilized in comparison with prior embodiments. However, such flexibility improves the system response to actual market demands. For example, a more powerful user terminal may not need all of the platforms to achieve the desired quality of service.

Having now fully described the invention, it will be apparent to one of ordinary skill in the art that many changes and modifications can be made thereto without departing from the spirit or scope of the invention as set forth herein.

The invention claimed is:

1. A method for establishing a plurality of communication links to a plurality of user terminals comprising:
    pre-processing a plurality of local user signals at a ground hub to compensate for differential propagation delays to any one of the plurality of user terminals;
    assigning each of said plurality of user terminals one or more resource cells in platform-code space at the ground hub;
    transmitting transmit signals to the hub through one or more of a plurality of individual transponding nodes using a first resource cell of the one or more resource cells;
    coherently receiving signals from more than one of the individual transponding nodes using a second resource cell of the one or more resource cells; and
    post-processing transmit signals at the ground hub to compensate for differential propagation delays such that all transmit signals from one of the plurality of user terminals may be coherently processed.

2. The method of claim 1, wherein at least one of said plurality of transponder nodes is selected from a tower based cellular network.

3. The method of claim 1, wherein at least one of said plurality of transponder nodes is selected from a high altitude platform system.

4. The method of claim 3, wherein said high altitude platform system includes a plurality of manned or unmanned airships.

5. The method of claim 3, wherein said high altitude platform system is comprised of a plurality of high altitude balloons.

6. The method of claim 3, wherein at least one of said plurality of transponder nodes is selected from a space based system.

7. The method of claim 3, wherein the first resource cell is the same as the second resource cell.

8. The method of claim 3, wherein the first resource cell is different than the second resource cell.

* * * * *